(12) United States Patent
Karam (10) Patent No.: US 11,061,219 B2
(45) Date of Patent: Jul. 13, 2021

(54) ADJUSTABLE FLUID LENS WITH REDUCED ABERRATION

(71) Applicant: CORNING INCORPORATED, Corning, NY (US)

(72) Inventor: Raymond Miller Karam, Santa Barbara, CA (US)

(73) Assignee: CORNING INCORPORATED, Corning, NY (US)

(*) Notice: Subject to any disclaimer, the term of this patent is extended or adjusted under 35 U.S.C. 154(b) by 216 days.

(21) Appl. No.: 16/312,019

(22) PCT Filed: Jun. 22, 2017

(86) PCT No.: PCT/US2017/038722
§ 371 (c)(1),
(2) Date: Dec. 20, 2018

(87) PCT Pub. No.: WO2017/223300
PCT Pub. Date: Dec. 28, 2017

(65) Prior Publication Data
US 2019/0377172 A1   Dec. 12, 2019

Related U.S. Application Data

(60) Provisional application No. 62/353,034, filed on Jun. 22, 2016.

(51) Int. Cl.
*G02B 26/00* (2006.01)
*G02B 3/12* (2006.01)
(Continued)

(52) U.S. Cl.
CPC .............. *G02B 26/005* (2013.01); *G02B 3/12* (2013.01); *G02B 3/14* (2013.01); *G02B 26/004* (2013.01); *G02B 27/0025* (2013.01)

(58) Field of Classification Search
CPC .... G02B 13/0075; G02B 26/005; G02B 3/12; G02B 13/0055; G02B 26/004; G02B 2207/115; G02B 27/0025; G02B 3/14
(Continued)

(56) References Cited

U.S. PATENT DOCUMENTS

| | | | |
|---|---|---|---|
| 4,890,903 A * | 1/1990 | Treisman | G02B 3/14 |
| | | | 359/666 |
| 2007/0041101 A1* | 2/2007 | Goosey, Jr. | G02B 26/005 |
| | | | 359/676 |

(Continued)

FOREIGN PATENT DOCUMENTS

| | | |
|---|---|---|
| CN | 1914522 A | 2/2007 |
| CN | 101632030 A | 1/2010 |

(Continued)

OTHER PUBLICATIONS

International Search Report and Written Opinion of the International Searching Authority; PCT/US2017/038722; dated Sep. 22, 2017; 10 Pages; European Patent Office.

(Continued)

*Primary Examiner* — Jordan M Schwartz (57) ABSTRACT

A fluid lens includes a refractive interface positioned between two transparent plates where at least one surface of one of the plates has a fixed radius of curvature configured to compensate for aberration produced by the fluid lens. The refracting interface can be formed by a meniscus formed between two immiscible liquids or by a membrane positioned between two fluids. A method of reducing aberration of a fluid lens includes determining a fixed radius of curvature for at least one surface of one of the plates that is sufficient to compensate for aberration produced by the fluid lens.

20 Claims, 2 Drawing Sheets

(51) Int. Cl.
*G02B 3/14* (2006.01)
*G02B 27/00* (2006.01)

(58) Field of Classification Search
USPC ............ 351/159.03, 159.34, 159.39, 159.68; 359/665–667
See application file for complete search history.

(56) References Cited

U.S. PATENT DOCUMENTS

| | | | |
|---|---|---|---|
| 2008/0231966 A1 | 9/2008 | Hendriks et al. | |
| 2008/0247019 A1* | 10/2008 | Kuiper | G02B 26/0808 359/196.1 |
| 2009/0116359 A1* | 5/2009 | Hendriks | G11B 7/13922 369/94 |
| 2009/0147373 A1* | 6/2009 | Rolland | A61B 5/0066 359/665 |
| 2012/0092775 A1* | 4/2012 | Duston | G02B 3/14 359/666 |
| 2012/0127581 A1* | 5/2012 | Shiao | G02B 3/14 359/666 |
| 2015/0163384 A1 | 6/2015 | Lee et al. | |
| 2019/0025575 A1* | 1/2019 | Wai | G02B 3/12 |

FOREIGN PATENT DOCUMENTS

| | | |
|---|---|---|
| CN | 101685170 A | 3/2010 |
| CN | 101950078 A | 1/2011 |
| CN | 103576217 A | 2/2014 |
| EP | 2238484 A1 | 10/2010 |
| WO | 2009/090585 A1 | 7/2009 |

OTHER PUBLICATIONS

Chinese Patent Application No. 201780050828.X, Office Action dated Sep. 29, 2020, 11 pages (6 pages of English Translation and 5 pages of Original Document); Chinese Patent Office.
Taiwanese Patent Application No. 106120919 Search Report dated Jan. 6, 2021; 1 Pages; Taiwanese Patent Office.

* cited by examiner

*FIG. 7 (Conventional)*

*FIG. 8*

ADJUSTABLE FLUID LENS WITH REDUCED ABERRATION

This application claims the benefit of priority under 35 U.S.C. § 371 of International Application No. PCT/US2017/038722, filed Jun. 22, 2017, which claims the benefit of priority to U.S. Provisional Application No. 62/353,034, filed Jun. 22, 2016, the content of each of which is incorporated herein by reference in its entirety.

BACKGROUND

1. Field

This disclosure relates to adjustable fluid lenses with reduced aberration.

2. Technical Background

A transmissive fluid lens uses two or more fluids to create an infinitely-variable lens without any moving parts by controlling a deformable refracting interface between the fluids. One type of fluid lens is a liquid lens. In a liquid lens, the refracting interface is provided by a meniscus formed between two immiscible liquids. The shape of the meniscus is determined by electrowetting forces controlled by applied voltages. Another type of fluid lens is a membrane-based lens. In a membrane-based lens, the refracting interface is provided by a membrane positioned between two fluids (two liquids, liquid and a gas or gas mixture, two gases or gas mixtures, etc.) with the shape of the membrane being controlled by piezoelectric actuation.

The shape of the refracting interface of a fluid lens during operation is spherical or approximately spherical and intrinsically produces third order spherical aberration across the image field for the transmitted optical beam. Spherical aberration causes beams parallel to, but distant from, the lens axis to be focused in a slightly different place than beams close to the axis. This manifests itself as a blurring of the image. The aberration becomes more significant as the optical power increases. Fluid lenses having high diopter refracting elements are especially susceptible to unacceptably high spherical aberration.

It would be desirable to develop a fluid lens that significantly reduces spherical aberration and/or compensates to some degree for the aberration intrinsic to the adjustable refracting interface within the lens. It would also be desirable to reduce the aberration without introducing additional complex or high-cost elements to the lens system and without making the manufacturing and assembly process unduly complicated.

SUMMARY

In some embodiments, a fluid lens having reduced aberration includes a refractive interface positioned between two transparent plates. The surface of at least one of the two transparent plates has a fixed radius of curvature that corrects or compensates for aberration produced by the shape of the refractive interface in the fluid lens. The fixed radius of curvature can compensate for a variety of aberrations but is especially suited to compensate for spherical aberration produced by the spherical shape of the refractive interface.

The transparent plates can have any suitable configuration. In some embodiments, one transparent plate includes a single surface having a fixed radius of curvature. In other embodiments, both transparent plates include one or more surfaces having a fixed radius of curvature. The one or more curved surfaces can be on the exterior or interior of the fluid lens.

The fluid lens can be any type of fluid lens. In some embodiments, the fluid lens is a liquid lens. In other embodiments, the fluid lens is a membrane-based lens. In other embodiments, the fluid lens can be a relatively high diopter lens that is especially susceptible to aberration such as spherical aberration.

A method for reducing aberration of a fluid lens can include determining a fixed radius of curvature for a surface of at least one transparent plate that is configured to compensate for aberration produced by the fluid lens. One way to do this is to select a radius of curvature that best compensates for an aberration profile produced by the fluid lens when it is at an intermediate and/or typical optical power. This provides the most effective aberration reduction at commonly used or intermediate optical powers while still providing some amount of aberration reduction at the high and low limits of the fluid lens's optical power.

Another way to determine the radius of curvature for the surface of the transparent plate is to first determine (a) the radius of curvature that best compensates for an aberration profile of the fluid lens when it is at or near the upper limit of its optical power and (b) the radius of curvature that best compensates for an aberration profile at or near the lower limit of its optical power and then select the radius curvature so that it is between (a) and (b).

The Summary is provided to introduce a selection of concepts in a simplified form that are further described below in the Detailed Description. The Summary and the Background are not intended to identify key concepts or essential aspects of the disclosed subject matter, nor should they be used to constrict or limit the scope of the claims. For example, the scope of the claims should not be limited based on whether the recited subject matter includes any or all aspects noted in the Summary and/or addresses any of the issues noted in the Background.

DRAWINGS

The preferred and other embodiments are disclosed in association with the accompanying drawings in which.

DETAILED DESCRIPTION

Figures 1, 2:
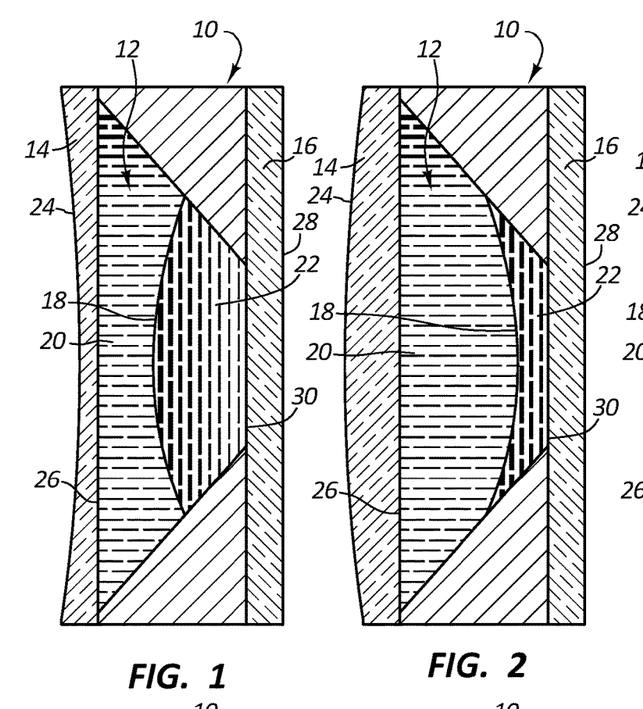
FIG. 1 is a cross-sectional view of one embodiment of a fluid lens with reduced aberration where an outer surface of a top transparent plate has a concave shape.
FIG. 2 is a cross-sectional view of another embodiment of a fluid lens with reduced aberration where an outer surface of a top transparent plate has a convex shape.

FIG. 1 shows one embodiment of a fluid lens 10 including a chamber 12 positioned between a first or top transparent plate 14 and a second or bottom transparent plate 16 (the transparent plates can also be referred to as cover plates, cover glasses, cover windows, or windows). The chamber 12 encloses a refracting interface or refracting element 18 positioned between a first fluid 20 and a second fluid 22.

It should be appreciated that the fluid lens 10 can be any suitable type of fluid lens including a liquid lens, membrane-based lens, and the like. Likewise, the fluids 20, 22 in the fluid lens 10 can be any suitable type of fluid including, but not limited to, liquids, gases, gels, and gel-like materials.

In those embodiments where the fluid lens 10 is a liquid lens, the fluids 20, 22 are liquids that are generally optically transparent, immiscible, have different indices of refraction, and have the same density. One of the fluids 20, 22 is typically electrically conductive and the other one is non-conductive—e.g., an aqueous liquid and an oily liquid. The refracting interface 18 is a meniscus formed between the immiscible fluids 20, 22. The shape of the refracting interface 18 can be adjusted by electrowetting to create variable focus lengths of high optical quality.

The liquid lens can provide a number of advantages. One advantage is that the amount of energy required to adjust the focus of the lens is relatively small. Another advantage is that the lens is capable of seamlessly transitioning between convex and concave lens shapes with switching times measured in milliseconds. Yet another advantage is that the lens is extremely shock and vibration resistant because it contains two liquids with matching density and no external moving parts. Yet another advantage is that the boundary between the two liquids 20, 22 forms an extremely smooth and regular surface, making the liquid lens suitable for precision applications such as medical imaging, microcameras, and telecommunications systems.

In those embodiments where the fluid lens 10 is a membrane-based lens, the membrane forms the refracting interface 18 and physically separates the fluids 20, 22. The presence of a physical barrier in the form of the membrane makes it possible to use fluids 20, 22 having widely varying properties. For example, the fluids 20, 22 can be any combination of liquids, gases, gels, and the like, regardless whether they are immiscible with each other, have the same density, etc. The membrane-based lens provides many of the same advantages described above in connection with the liquid lens.

Returning to FIG. 1, the first transparent plate 14 has an outer surface 24 that is not planar and an inner surface 26 that is planar. The second transparent plate 16 has an outer surface 28 and an inner surface 30 that are both planar. The outer surface 24 of the first transparent plate 14 has a fixed radius of curvature that is configured to compensate for the aberration produced by the refractive interface 18. Specifically, the geometry of the curvature of the outer surface 24 is configured to produce an aberration that acts opposite to the spherical aberration produced by the refracting interface 18 between the fluids 20, 22.

The radius of curvature of the outer surface 24 of the first transparent plate 14 can be positive or negative depending on the expected curvature orientation of the refracting interface 18 in the chamber 12. The radius of curvature of the outer surface 24 should be the opposite sign as the radius of curvature of the refracting interface 18 in order to correct or compensate for aberration produced by the fluid lens 10.

The radius of curvature of the outer surface 24 can be spherical or aspheric. A spherical curvature is preferable because it can completely or nearly completely correct aberration at any given optical power. However, a useful degree of correction can be achieved at various optical powers using an aspheric curvature.

The radius of curvature of the outer surface 24 of the first transparent plate 14 can be specifically chosen to correct and/or minimize the spherical aberration of the entire fluid lens assembly 10 when the lens is operating at high power (high diopter values). The radius of curvature can also be optimized based on the refractive index of the material used to form the first transparent plate 14. In the typical case of an imposed spherical curvature, different radii of curvature will be required for materials of different refractive index.

The radius of curvature of the outer surface 24 can be calculated and optimized to balance performance across the full expected operating range of lens power. This minimizes aberration across the entire operating range instead of at a single lens power. If the chosen radius of curvature for the outer surface 24 is too large or too small, then the extra "lens power" provided by the first transparent plate 14 may over-correct or under-correct the spherical aberration of the refracting interface 18 when the fluid lens 10 is at the low diopter or high diopter ends of the operating range of the optical system.

It should be noted that the additional positive or negative optical power contributed by the first transparent plate 14 is typically insignificant in comparison to the power of the adjustably curved refracting interface 18 within the fluid lens 10. The curved outer surface 24 of the first transparent plate 14 primarily compensates for aberration and does not significantly contribute to the optical power of the fluid lens 10.

The fluid lens 10 can have numerous different configurations. FIGS. 1-6 show some of those configurations where the outer surfaces 24, 28 of the plates 14, 16 have various combinations of concave or convex shapes and the inner surfaces 26, 30 are flat. In these embodiments, the plates 14, 16 are plano-concave or plano-convex with the flat surface facing the interior of the chamber 12. These configurations are potentially advantageous because the presence of the curved, exterior facing surfaces 24, 28 on the plates 14, 16 do not have any effect on the refracting interface 18 inside the chamber 12.

FIGS. 1-2 show that a concave or convex radius of curvature, respectively, can be imposed on the outer surface 24 of the first transparent plate 14 to compensate for spherical aberration produced by the refracting interface 18 inside the chamber 12. It should be noted that the radius of curvature of the outer surface 24 is the opposite sign of the radius of curvature of the refracting interface 18. The same is true for all the embodiments shown in FIGS. 1-6.

Figure 3:
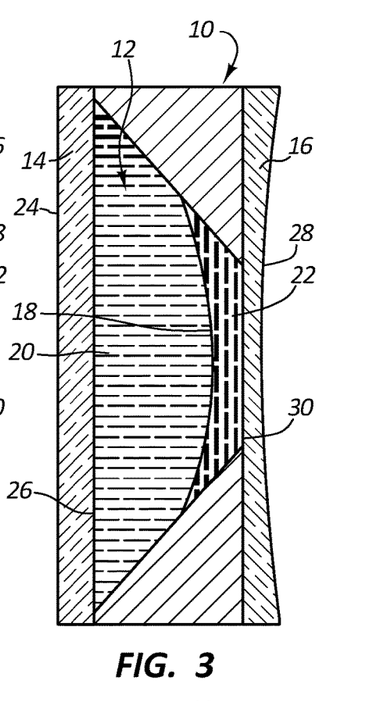
FIG. 3 is a cross-sectional view of another embodiment of a fluid lens with reduced aberration where an outer surface of a bottom transparent plate has a concave shape.
Figures 4, 5:
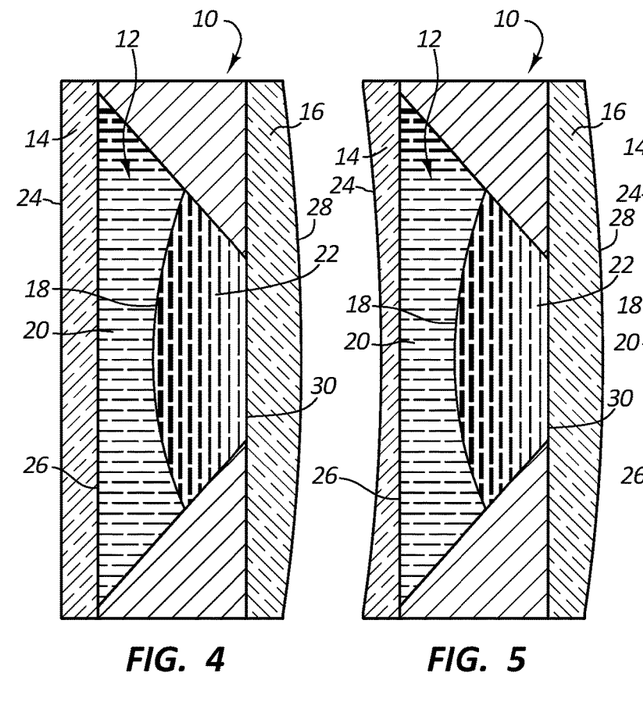
FIG. 4 is a cross-sectional view of another embodiment of a fluid lens with reduced aberration where an outer surface of a bottom transparent plate has a convex shape.
FIG. 5 is a cross-sectional view of another embodiment of a fluid lens with reduced aberration where an outer surface of a top transparent plate has a concave shape and the outer surface of a bottom transparent plate has a convex shape.

FIGS. 3-4 show that a concave or convex radius of curvature, respectively, can be imposed on the outer surface 28 of the second transparent plate 16 to compensate for spherical aberration produced by the refracting surface 18 inside the chamber 12. Although these embodiments function adequately, they may have a practical drawback in applications where the fluid lens 10 is positioned on top of another lens stacks system. In these cases, assembly issues may arise because of the curved outer surface 28.

Figure 6:
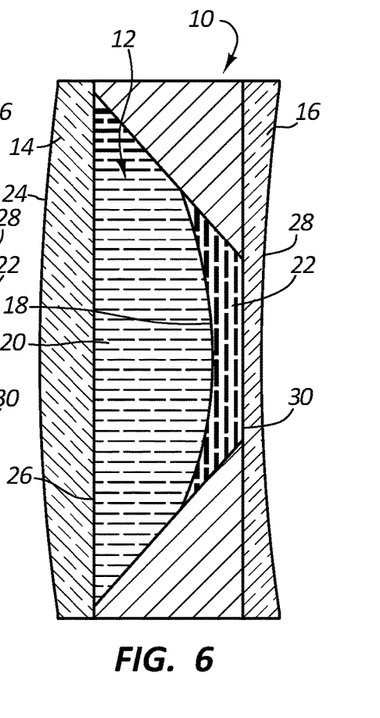
FIG. 6 is a cross-sectional view of another embodiment of a fluid lens with reduced aberration where an outer surface of a top transparent plate has a convex shape and the outer surface of a bottom transparent plate has a concave shape.

FIGS. 5-6 show that concave and convex radii of curvatures can be imposed on both of the outer surfaces 24, 28 of the plates 14, 16 to compensate for spherical aberration produced by the refracting surface 18 inside the chamber 12. These configurations may be particularly useful in situations where the working range of the fluid lens 10 is very large—e.g., working range from 0 diopter all the way up to 100 diopters. In these situations, it is also possible to add one or more additional fluid lenses 10 lenses to the stack.

It should be appreciated that the inner surfaces 26, 30 of the plates 14, 16 can also have a concave or convex radius of curvature. For example, in some embodiments, the outer surfaces 24, 28 of the plates 14, 16 are flat and one or both of the inner surfaces 26, 30 have a concave or convex shape configured to compensate for aberration produced by the fluid lens 10. In other embodiments, any of the embodiments shown in FIGS. 1-6 can be modified so that one or both of the inner surfaces 26, 30 have a concave or convex shape configured to compensate for aberration produced by the fluid lens 10. In all of these embodiments, the sign of the radius of curvature of the inner surfaces 26, 30 of the plates 14, 16 should be opposite the sign of the radius of curvature of the refracting interface 18 so that the inner surfaces 26, 30 function to reduce spherical aberration. One potential disadvantage of these embodiments is that curving one or both of the inner surfaces 26, 30 may adversely affect the characteristics of the refracting interface 18 formed between the fluids 20, 22 in the fluid lens 10, especially in those situations where the fluid lens 10 is a liquid lens.

The plates 14, 16 can be made of any suitable material that is transparent in the operational optical range of the fluid lens 10. Examples of suitable materials include optical grade glass (glass includes glass and glass ceramics) and optical grade polymers.

The plates 14, 16 can be made using any suitable process. In some embodiments, the plates 14, 16 are made by grinding and polishing. In other embodiments, the plates 14, 16 are made by hot pressing, which is a scalable process that can be readily applied to batch fabrication and has the advantage of not requiring the material to be melted. Hot pressing can be used with glass or polymer substrates.

The plates 14, 16 can be used to enclose the fluids 20, 22 inside the chamber 12. For example, as shown in FIGS. 1-6, the plates 14, 16 can form the top and bottom of the chamber 12. In other embodiments, the plates 14, 16 can be coupled to the chamber 12 without enclosing the fluids 20, 22 inside. For example, the plates 14, 16 can be coupled to the exterior surface of the already formed chamber 12 using adhesive or any other suitable fastening method.

A number of methods can be used to make the fluid lens 10. In general, the methods include determining the radius of curvature for one or more surfaces 24, 26, 28, 30 of the transparent plates 14, 16 that reduces aberration produced by the fluid lens 10. In general, the curvature of the plates 14, 16 should be sufficient to produce an aberration profile that is at least approximately equal and opposite to an aberration profile of the fluid lens 10 at a given optical power or over a range of optical powers. Such an aberration profile for the plates 14, 16 acts to counteract the aberration profile produced by the fluid lens 10. It should be understood that the term "at least approximately" is used in this context to separately modify both of the terms "equal" and "opposite."

The fluid lens 10 can be adjustable through a full range of optical powers. One way to determine the radius of curvature for one or more of the surfaces 24, 26, 28, 30 of the transparent plates 14, 16 is to determine the aberration profile for the fluid lens 10 when it is at an intermediate and/or typical optical power and then select a radius of curvature having an aberration profile that is at least approximately equal and opposite to the aberration profile of the fluid lens 10. In some embodiments, the aberration profile for the fluid lens 10 can be determined for the full field of view of the lens and at an optical power that is 10% to 90% of the full range of optical powers, 20% to 80% of the full range of optical powers, 30% to 70% of the full range of optical powers, or 40% to 60% of the full range of optical powers. The radius of curvature for any of the surfaces 24, 26, 28, 30 of the plates 14, 16 can be those that produce an aberration profile that is at least approximately equal and opposite to any of these aberration profiles of the fluid lens 10.

Another way to determine the radius of curvature for one or more of the surfaces 24, 26, 28, 30 of the transparent plates 14, 16 is to determine aberration profiles for the fluid lens 10 when it is at or near the ends of its optical power range, determine the radii of curvature that are at least approximately equal and opposite to the aberration profiles, and select a radius of curvature that is between the identified radii of curvature. In some embodiments, the aberration profiles for the fluid lens 10 are determined when the optical power of the fluid lens is no more than 10% of the full range of optical powers and at least 90% of the full range of optical powers, or no more than 20% of the full range of optical powers and at least 80% of the full range of optical powers, or no than 30% of the full range of optical powers and at least 70% of the full range of optical powers.

Another method by which the fluid lens 10 characterized by low aberration between a lower limit optical power and a higher limit optical power may be achieved is described. The value of the radius of curvature of any of the surfaces 24, 26, 28, 30 of the transparent plates 14, 16 can be determined by the following steps. Initially, a first aberration profile is calculated over the full field of view of the fluid lens 10 for a state in which the fluids 20, 22 are controlled by electrowetting or piezoelectric actuation to provide the lower limit optical power. Next, a first radius of curvature is calculated for one of the surfaces 24, 26, 28, 30 that would result in an aberration profile that is at least approximately equal and opposite to the first aberration profile. Then, a second aberration profile is calculated over the full field of view of the fluid lens 10 for a state in which the fluids 20, 22 are controlled by electrowetting or piezoelectric actuation to provide the higher limit optical power. Next, a second radius of curvature is calculated for one of the surfaces 24, 26, 28, 30 that would result in an aberration profile that is at least approximately equal and opposite to the second aberration profile. Finally, the fixed radius of curvature is chosen that has a value lying between the first radius of curvature and the second radius of curvature. In this way, although aberration is not perfectly compensated for throughout the range of optical powers between the lower limit and the higher limit, a significant reduction in aberration may be provided throughout that range.

In some embodiments, the radius of curvature is calculated by applying a specific weighting factor corresponding to the desired lens optical power or power range. The weighting factor may be determined by experience in ways that are apparent to those of skill in the art.

In other embodiments, instead of choosing a compensating curvature that lies between perfectly compensating curvatures calculated at or near the end points of the range of optical power values, a perfectly compensating curvature can be calculated for one typical or mid-range optical power value and used for one or more of the surfaces 24, 26, 28, 30 of the transparent plates 14, 16.

In those embodiments including at least two curved surfaces 24, 26, 28, 30, the radius of curvature of each surface can be configured to compensate for a portion of the aberration produced by the fluid lens 10 so that the combination of all the curved surfaces compensates for most or all of the aberration.

EXAMPLES

The following examples show the modulation transfer function (MTF) characteristics of a conventional liquid lens that has not been modified to reduce aberration and a liquid lens that has been modified to reduce aberration. The MTF charts show resolution and contrast information simultaneously allowing a comparison of the performance of the two lenses.

The following examples are provided to further illustrate the disclosed subject matter. They should not be used to constrict or limit the scope of the claims in any way.

Example 1

Figure 7:
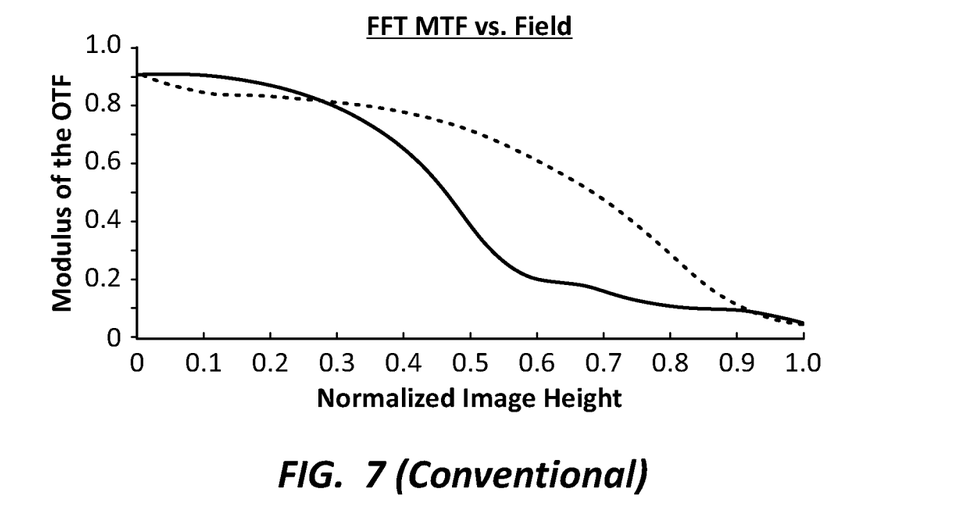
FIG. 7 is a simulated modulation transfer function (MTF) graph of a conventional liquid lens that does not compensate for aberration.

The MTF at a spatial frequency of 45 cycles/mm was simulated for a conventional liquid lens having a 2 mm aperture operating at 10 diopters. The liquid lens did not include any correction for spherical aberration caused by the curved interface between the liquids. FIG. 7 shows the MTF chart with solid lines representing tangential image rays and dotted lines representing sagittal image rays.

The MTF chart shows that the expected performance of the liquid lens drops significantly at image field points of approximately 0.5 field and beyond. This indicates that the liquid lens provides poor image quality across the field of view and especially at the corner edges of the image.

Example 2

Figure 8:
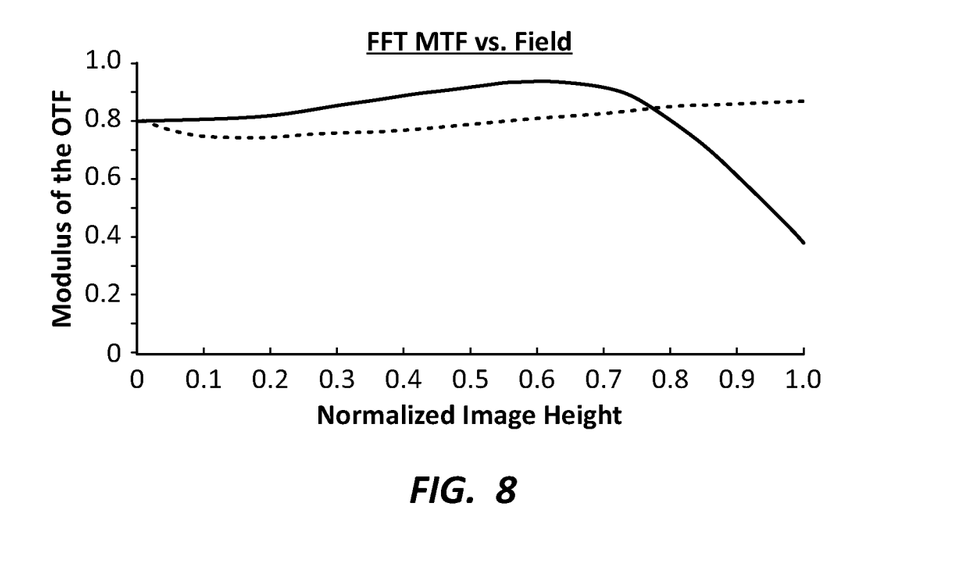
FIG. 8 is a simulated modulation transfer function (MTF) graph of a liquid lens having a configuration as the fluid lens shown in FIG. 1.

The MTF at a spatial frequency of 45 cycles/mm was simulated for a liquid lens having a 2 mm aperture operating at 12 diopters. The liquid lens included a curved cover plate such as that shown in FIG. 3 to correct for spherical aberration caused by the curved interface between the liquids. FIG. 8 shows the MTF chart with solid lines representing tangential image rays and dotted lines representing sagittal image rays.

The MTF chart shows that the expected performance of the liquid lens is greatly improved compared to the conventional liquid lens in Example 1. The optical performance is substantially better all the way out to 1.0 field even though the lens is operated at a higher power than the conventional liquid lens in Example 1.

Illustrative Embodiments

Reference is made in the following to several illustrative embodiments of the disclosed subject matter. The following embodiments illustrate only a few selected embodiments that may include one or more of the various features, characteristics, and advantages of the disclosed subject matter. Accordingly, the following embodiments should not be considered as being comprehensive of all the possible embodiments.

In one embodiment, an adjustable lens is characterized by low aberration between a lower limit optical power and a higher limit optical power. The lens comprises a chamber enclosing a deformable refracting interface between first and second transparent plates where the first plate includes a surface having a fixed radius of curvature. The fixed radius of curvature can be determined by calculating a first aberration profile over the full field of view of the lens for a state when the deformable interface is adjusted to provide the lower limit optical power, calculating a first radius of curvature for the first plate that would result in an aberration profile equal and opposite to the first aberration profile, calculating a second aberration profile over the full field of view of the lens for a state when the deformable interface is adjusted to provide the higher limit optical power, calculating a second radius of curvature for the first plate that would result in an aberration profile equal and opposite to the second aberration profile, and choosing the fixed radius of curvature to lie between the first radius of curvature and the second radius of curvature.

The surface of the first plate having the fixed radius of curvature can face the exterior of the lens. The first plate can be plano-concave or plano-convex. The first plate can be aspherical. The first plate can be a diffractive optical element. The first plate can be positioned at the top of the lens. The first plate can be positioned at the bottom of the lens. Each of the first and second plates can have an outer surface facing the exterior of the lens and an inner surface facing the interior of the lens, and each of the inner surfaces can be planar. Each of the first and second plates can have an outer surface facing the exterior of the lens and an inner surface facing the interior of the lens, and an inner surface of at least one of the top and bottom plates can have a convex or a concave curvature. The first plate can comprise glass or plastic. The refracting interface can be provided by a meniscus between two liquids or by a flexible membrane.

In another embodiment, a method of providing a lens characterized by low aberration between a lower limit optical power and a higher limit optical power comprises fabricating the lens to comprise a chamber enclosing a deformable refracting interface between first and second transparent plates where the first plate includes a surface having a fixed radius of curvature. The fixed radius of curvature can be determined by calculating a first aberration profile over the full field of view of the lens for a state when the deformable interface is adjusted to provide the lower limit optical power, calculating a first radius of curvature for the first plate that would result in an aberration profile equal and opposite to the first aberration profile, calculating a second aberration profile over the full field of view of the lens for a state when the deformable interface is adjusted to provide the higher limit optical power, calculating a second radius of curvature for the first plate that would result in an aberration profile equal and opposite to the second aberration profile, and choosing the fixed radius of curvature to lie between the first radius of curvature and the second radius of curvature. The refracting interface can be provided by a meniscus between two liquids or by a membrane.

In another embodiment, a method of providing a lens characterized by low aberration at a target optical power comprises fabricating the lens to comprise a chamber enclosing a deformable refracting interface between first and second transparent plates where the first plate includes a surface having a plate radius of curvature. The plate radius of curvature can be determined by calculating an aberration profile over the full field of view of the lens for a state when the deformable interface is adjusted to provide the target optical power, calculating a correcting radius of curvature for the first plate that would result in an aberration profile equal and opposite to the first aberration profile, and choosing the plate radius of curvature to be equal to the correcting radius of curvature. The refracting interface can be provided by a meniscus between two liquids or by a membrane between two fluids Terminology and Interpretative Norms The term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

Spatial or directional terms, such as "left," "right," "front," "back," and the like, relate to the subject matter as it is shown in the drawings. However, it is to be understood that the described subject matter may assume various alternative orientations and, accordingly, such terms are not to be considered as limiting.

Articles such as "the," "a," and "an" can connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, and the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should be construed in light of the number of recited significant digits and by applying ordinary rounding techniques.

All disclosed ranges are to be understood to encompass and provide support for claims that recite any and all subranges or any and all individual values subsumed by each range. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

All disclosed numerical values are to be understood as being variable from 0-100% in either direction and thus provide support for claims that recite such values or any and all ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range (e.g., 15.2).

The drawings shall be interpreted as illustrating one or more embodiments that are drawn to scale and/or one or more embodiments that are not drawn to scale. This means the drawings can be interpreted, for example, as showing: (a) everything drawn to scale, (b) nothing drawn to scale, or (c) one or more features drawn to scale and one or more features not drawn to scale. Accordingly, the drawings can serve to provide support to recite the sizes, proportions, and/or other dimensions of any of the illustrated features either alone or relative to each other. Furthermore, all such sizes, proportions, and/or other dimensions are to be understood as being variable from 0-100% in either direction and thus provide support for claims that recite such values or any and all ranges or subranges that can be formed by such values.

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

The subject matter recited in the claims is not coextensive with and should not be interpreted to be coextensive with any embodiment, feature, or combination of features described or illustrated in this document. This is true even if only a single embodiment of the feature or combination of features is illustrated and described in this document.

INCORPORATION BY REFERENCE

The entire contents of each of the documents listed below are incorporated by reference into this document. If the same term is used in both this document and one or more of the incorporated documents, then it should be interpreted to have the broadest meaning imparted by any one or combination of these sources unless the term has been explicitly defined to have a different meaning in this document. If there is an inconsistency between any of the following documents and this document, then this document shall govern. The incorporated subject matter should not be used to limit or narrow the scope of the explicitly recited or depicted subject matter.

U.S. Prov. App. No. 62/353,034, titled "Adjustable Compact Lens with Reduced Aberration," filed on 22 Jun. 2016.

The invention claimed is:

1. A fluid lens comprising:
a refracting interface positioned between a first fluid and a second fluid enclosed in a chamber;
a first transparent plate comprising (i) a surface in which substantially the entirety of optically effective portion of the surface has a fixed radius of curvature facing away from the refracting interface and (ii) a second surface that is planar facing toward the refracting interface; and
a second transparent plate;
wherein the refracting interface is positioned between the first transparent plate and the second transparent plate;
wherein the fixed radius of curvature is configured to compensate for aberration produced by the refracting interface; and wherein the first transparent plate and the second transparent plate cooperate to enclose the first fluid and the second fluid in the chamber.

2. The fluid lens of claim 1 wherein the first transparent plate is plano-concave.

3. The fluid lens of claim 1 wherein the first transparent plate is plano-convex.

4. The fluid lens of claim 1 wherein the refracting interface comprises a radius of curvature with a sign that is opposite a sign of the fixed radius of curvature of the surface.

5. The fluid lens of claim 1 wherein:
the fluid lens is adjustable through a range of optical powers; and
the fixed radius of curvature has an aberration profile that is at least approximately equal and opposite to an aberration profile of the refracting interface when the fluid lens has an optical power that is 10% to 90% of the range of optical powers.

6. The fluid lens of claim 1 wherein:
the fluid lens is adjustable through a range of optical powers; and
the fixed radius of curvature is between: (a) a first radius of curvature with an aberration profile that is at least approximately equal and opposite to an aberration profile of the refracting interface when the fluid lens has an optical power that is no more than 10% of the range of optical powers and (b) a second radius of curvature with an aberration profile that is approximately equal and opposite to an aberration profile of the refracting interface when the fluid lens has an optical power that is at least 90% of the range of optical powers.

7. A fluid lens comprising:
a refracting interface positioned between a first fluid and a second fluid enclosed in a chamber;
a first transparent plate in direct contact with the first fluid comprising an outer surface facing away from the refracting interface and an inner surface facing the refracting interface, the outer surface having substantially the entirety of the optically effective portion of the surface with a fixed radius of curvature that is configured to compensate for aberration that the refracting interface produces, and the inner surface being planar; and
a second transparent plate in direct contact with the second fluid; comprising an outer surface facing away from the refracting interface and an inner surface facing the refracting interface, the inner surface being planar;
wherein the refracting interface is positioned between the first transparent plate and the second transparent plate.

8. The fluid lens of claim 7 wherein:
the second transparent plate comprises an outer surface facing away from the refracting interface and an inner surface facing the refracting interface; and
at least one of (i) the outer surface of the first transparent plate has a convex or concave curvature or (ii) the outer surface of the second transparent plate has a convex or concave curvature.

9. The fluid lens of claim 1 wherein the first fluid and the second fluid are both liquid.

10. The fluid lens of claim 1 wherein at least one of the first fluid or the second fluid is a gas.

11. The fluid lens of claim 1 wherein the refracting interface is formed by a meniscus between the first fluid and the second fluid.

12. The fluid lens of claim 1 wherein the refracting interface is formed by a membrane between the first fluid and the second fluid.

13. The fluid lens of claim 1 wherein the first transparent plate comprises glass.

14. The fluid lens of claim 1 wherein the first transparent plate comprises plastic.

15. The fluid lens of claim 1 wherein the refracting interface of the fluid lens is adjustable.

16. A method of reducing aberration of a fluid lens, the method comprising:
determining a fixed radius of curvature for an outer surface of a first transparent plate that is configured to compensate for aberration produced by a refracting interface positioned between a first fluid and a second fluid of the fluid lens, the first transparent plate further comprising an inner surface that is planar; substantially the entirety of the optically effective portion of the outer surface of the first transparent plate has the fixed radius of curvature;
enclosing the refracting interface between the first transparent plate and a second transparent plate in a chamber; and wherein the first transparent plate and the second transparent plate cooperate to enclose the first fluid and the second fluid in the chamber.

17. The method of claim 16 wherein the refracting interface is adjustable through a range of optical powers, the method further comprising determining the fixed radius of curvature for the surface of the first transparent plate that is at least approximately equal and opposite to an aberration profile for the refracting interface when the refracting interface has an optical power that is 10% to 90% of the range of optical powers.

18. The method of claim 16 wherein the refracting interface is adjustable through a range of optical powers, the method further comprising determining the fixed radius of curvature for the surface of the first transparent plate that is between: (a) a first radius of curvature with an aberration profile that is at least approximately equal and opposite to an aberration profile of the refracting interface when the refracting interface has an optical power that is no more than 10% of the range of optical powers and (b) a second radius of curvature with an aberration profile that is approximately equal and opposite to an aberration profile of the refracting interface when the refracting interface has an optical power that is at least 90% of the range of optical powers.

19. The fluid lens of claim 1 wherein:
the second transparent plate comprises a second fixed radius of curvature; and
each of the radius of curvature of the first transparent plate and the second fixed radius of curvature of the second transparent plate is configured to compensate for a portion of the aberration produced by the refracting interface whereby the combination of the radius of curvature of the first transparent plate and the second fixed radius of curvature of the second transparent plate is configured to compensate for the aberration produced by refracting interface.

20. The fluid lens of claim 7 wherein the first transparent plate is plano-convex.

* * * * *